United States Patent
Han et al.

(10) Patent No.: US 7,816,010 B2
(45) Date of Patent: Oct. 19, 2010

(54) BLACK MATRIX FOR COLOR FILTER AND ITS METHOD OF MANUFACTURE

(75) Inventors: In-taek Han, Yongin-si (KR); Wou-sik Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 673 days.

(21) Appl. No.: 11/797,340

(22) Filed: May 2, 2007

(65) Prior Publication Data

US 2008/0118739 A1    May 22, 2008

(30) Foreign Application Priority Data

Nov. 22, 2006    (KR) .................... 10-2006-0116058

(51) Int. Cl.
*B32B 9/00* (2006.01)

(52) U.S. Cl. .................. 428/408; 428/323; 430/321; 977/742

(58) Field of Classification Search .............. 428/323, 428/408; 359/885; 430/321, 7, 106; 977/742
See application file for complete search history.

(56) References Cited

U.S. PATENT DOCUMENTS

| 6,468,702 B1 * | 10/2002 | Yi et al. ................. 430/7 |
| 7,294,372 B2 * | 11/2007 | Cok ................ 428/1.31 |
| 2007/0065571 A1 * | 3/2007 | White et al. ............. 427/68 |
| 2007/0157839 A1 * | 7/2007 | Kim et al. ............... 101/483 |

FOREIGN PATENT DOCUMENTS

JP    08286026 A    * 11/1996

OTHER PUBLICATIONS

Li et al., Super-hydrophobicity of large-area honeycomb-like aligned carbon nanotubes, Aug. 20, 2002, Journal of Physical Chemistry B, 106, p. 9274-9276.*
Tomioka et al., Preparation and structural characterization of fullerene C60 Langmuir film, No month 1993, Langmuir, 9, p. 32-36.*
Vourdas et al., Increased plasma etch resistance of thin polymeric and phototresist films, Jan. 11, 2005, 78-79, p. 474-478.*
Mirkin, et al., Thin film, fullerene-based materials, No month 1996, Tetrahedron, 52, p. 5113-5130.*
Hoppe et al., Nanoscale morphology of conjugated polymer/fullerene-based bulk-heterojunction solar cells, Oct. 2004, 14, p. 1005-1011.*
Wikipedia definition of Fullerene, webpage, no date.*
Machine Translation of JP 08286026 A to Sakakawa et al., Nov. 1996.*

* cited by examiner

*Primary Examiner*—Timothy M Speer
(74) *Attorney, Agent, or Firm*—Cantor Colburn LLP

(57) ABSTRACT

A black matrix for a color filter and its method of manufacture include: forming the black matrix in a predetermined shape on a substrate to define a plurality of pixel regions: forming a light shade layer on the substrate, the light shade layer being formed of an ink-philic black material; and forming a Carbon NanoTube (CNT) layer on an upper surface of the light shade layer.

34 Claims, 4 Drawing Sheets

BLACK MATRIX FOR COLOR FILTER AND ITS METHOD OF MANUFACTURE

CLAIM OF PRIORITY

This application makes reference to, incorporates the same herein, and claims all benefits accruing under 35 U.S.C. §119 from an application for BLACK MATRIX FOR COLOR FILTER AND METHOD OF MANUFACTURING THE BLACK MATRIX earlier filed in the Korean Intellectual Property Office on Nov. 22, 2006 and there duly assigned Serial No. 10-2006-0116058.

BACKGROUND OF THE INVENTION

1. Field of the Invention

The present invention relates to a black matrix for a color filter, and more particularly, the present invention relates to a black matrix for a color filter and its method of manufacture that prevents ink color mixing between pixels of a color filter to increase color reproducibility and contrast ratio.

2. Description of the Related Art

Conventionally, Cathode Ray Tube (CRT) monitors have been generally used to display image information of televisions and computers. However, flat panel displays, such as Liquid Crystal Displays (LCDs), Plasma Display Panels (PDPs), Organic Light Emitting Diodes (OLEDs), Light Emitting Diode (LED) displays, or Field Emission Displays (FEDs) are now being used due to their increased screen size. Of these, LCDs which are mainly used in computer monitors or notebook computers draw attention due to their low power consumption.

Generally, an LCD includes a color filter that forms a desired color image by transmitting white light modulated by a liquid crystal layer. To manufacture the color filter, after a black matrix is formed in a predetermined shape on a transparent substrate, pixels of each of a plurality of colors are formed by injecting a predetermined color, for example, red, green and blue color inks using, for example, an inkjet method, into each of the pixel regions defined by the black matrix.

In manufacturing the color filter, if upper and side surfaces of the black matrix have an ink-philic property, there is a possibility that the inks injected into the pixel regions can be mixed due to overflow of the inks on the upper surface of the black matrix. On the other hand, if the upper and side surfaces of the black matrix have an ink-phobic property, the ink mix between the pixel regions can be prevented. However, the inks cannot be distributed in uniform thickness in the pixel regions since the side surfaces of the black matrix do not have wettability with respect to the inks. Accordingly, there is light leakage at side surfaces of the black matrix, and as a result, the color reproducibility and contrast ratio of the color filter are reduced.

Therefore, to address the ink mixing and light leakage problems of the black matrix, the upper surface of the black matrix should have an ink-phobic property and the side surfaces of the black matrix should have an ink-philic property.

SUMMARY OF THE INVENTION

The present invention provides a black matrix for a color filter that prevents ink color mixing between pixels of a color filter and increases color reproducibility and contrast ratio, and its method of manufacture.

According to one aspect of the present invention, a black matrix of a color filter is provided, the black matrix including: a light shade layer of an ink-philic black material arranged on a substrate of the color filter; and a Carbon NanoTube (CNT) layer arranged on an upper surface of the light shade layer.

The CNT layer preferably includes an ink-phobic material.

The light shade layer preferably includes a polymer group organic resin. The light shade layer includes a polyimide.

The CNT layer preferably has a thickness in a range of from 0.05 μm to 10 μm.

According to another aspect of the present invention, a color filter is provided including: a substrate; a black matrix arranged in a predetermined shape on the substrate to define a plurality of pixel regions, the black matrix including a light shade layer of an ink-philic black material arranged on the substrate and a Carbon NanoTube (CNT) layer arranged on an upper surface of the light shade layer; and ink layers having predetermined colors contained within each of the pixel regions.

According to still another aspect of the present invention, a black matrix of a color filter is provided, the black matrix including: a light shade layer of an ink-philic black material arranged on a substrate of the color filter; and a fullerene layer arranged on an upper surface of the light shade layer.

The fullerene layer preferably includes an ink-phobic material.

The light shade layer preferably includes a polymer group organic resin. The light shade layer preferably includes a polyimide.

The fullerene layer preferably has a thickness in a range of from 0.01 μm to 1 μm.

According to yet another aspect of the present invention, a color filter is provided including: a substrate; a black matrix arranged in a predetermined shape on the substrate to define a plurality of pixel regions, the black matrix including a light shade layer of an ink-philic black material arranged on the substrate and a fullerene layer arranged on an upper surface of the light shade layer; and ink layers having predetermined colors contained within each of the pixel regions.

According to a further aspect of the present invention, a method of manufacturing a black matrix for a color filter is provided, the method including: forming a light shade layer of an ink-philic black material on a substrate; forming a Carbon NanoTube (CNT) layer on an upper surface of the light shade layer; and patterning the CNT layer and the light shade layer.

The CNT layer is preferably formed by coating a dispersed solution, in which CNTs are dispersed in a solvent, on an upper surface of the light shade layer.

Coating the dispersed solution is preferably performed by one of spin coating, spray coating, or dip coating.

The CNT layer is preferably formed by directly growing CNTs on the upper surface of the light shade layer using a Chemical Vapor Deposition (CVD) method. The CNT layer is preferably formed to a thickness in a range of from 0.05 μm to 10 μm.

The light shade layer is preferably formed of a polymer group organic resin. The light shade layer is formed of a polyimide.

The patterning of the CNT layer and the light shade layer preferably includes: coating a photoresist on an upper surface of the CNT layer; exposing and developing the photoresist to a predetermined shape using a photolithography process; etching the CNT layer exposed through the developed photoresist and the light shade layer under the CNT layer; and removing the photoresist.

Etching of the CNT layer and the light shade layer is preferably performed using a plasma etching method.

The light shade layer is preferably formed of a photosensitive material.

Patterning of the CNT layer and the light shade layer is preferably achieved by exposing and developing the light shade layer to a predetermined shape using a photolithography process.

According to another aspect of the present invention, a method of manufacturing a black matrix for a color filter is provided, the method including: forming a light shade layer of an ink-philic black material on a substrate; forming a fullerene layer on an upper surface of the light shade layer; and patterning the fullerene layer and the light shade layer.

The fullerene layer is preferably formed by coating a dispersed solution, in which fullerene is dispersed in a solvent, on an upper surface of the light shade layer.

Coating the dispersed solution is preferably performed by one of spin coating, spray coating, or dip coating.

The fullerene layer is preferably formed using a vacuum evaporation method. The fillerene layer is formed to a thickness in a range of from 0.01 µm to 1 µm.

The light shade layer is preferably formed of a polymer group organic resin. The light shade layer is preferably formed of a polyimide.

Patterning of the fullerene layer and the light shade layer preferably includes: coating a photoresist on an upper surface of the fullerene layer; exposing and developing the photoresist to a predetermined shape using a photolithography process; etching the fullerene layer exposed through the developed photoresist and the light shade layer under the fullerene layer; and removing the photoresist.

Etching of the fullerene layer and the light shade layer is preferably performed using a plasma etching method.

The light shade layer is preferably formed of a photosensitive material.

Patterning of the fullerene layer and the light shade layer is preferably achieved by exposing and developing the light shade layer to a predetermined shape using a photolithography process.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention is described more fully below with reference to the accompanying drawings in which exemplary embodiments of the present invention are shown.

Figure 1:
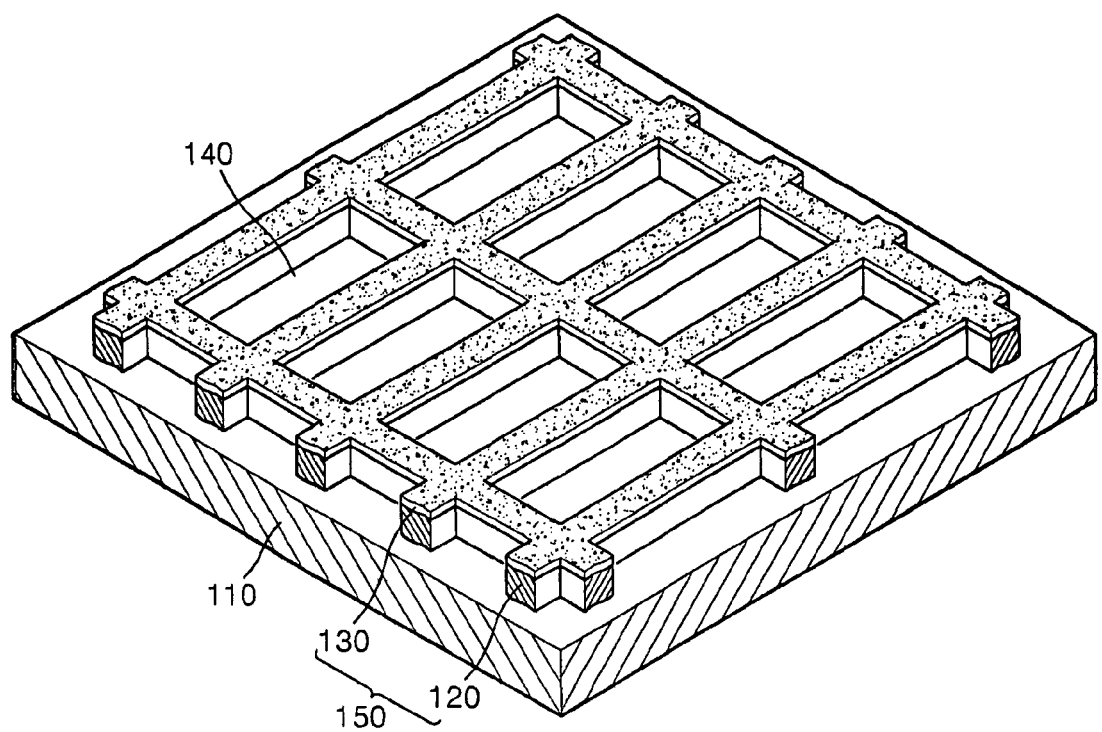
FIG. 1 is a partial perspective view of a black matrix for a color filter according to an embodiment of the present invention.
Figure 2:
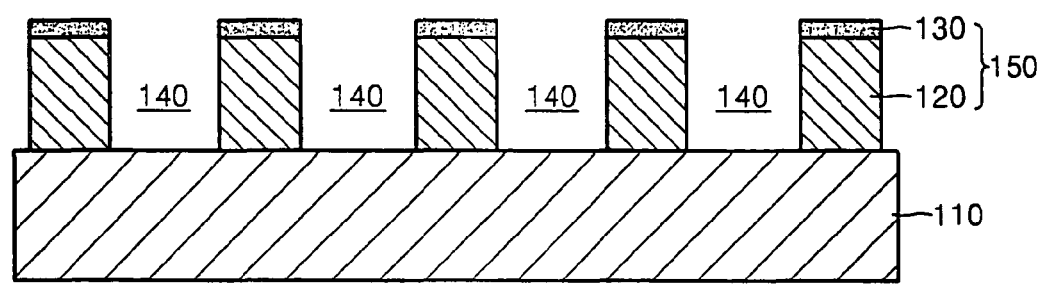
FIG. 2 is a cross-sectional view of the black matrix for the color filter of FIG. 1, according to an embodiment of the present invention.

FIG. 1 is a partial perspective view of a black matrix 150 for a color filter according to an embodiment of the present invention, and FIG. 2 is a cross-sectional view of the black matrix for the color filter of FIG. 1.

Referring to FIGS. 1 and 2, the black matrix 150 according to an embodiment of the present invention is formed in a predetermined shape on a substrate 110. A plurality of pixel regions 140 are defined by the black matrix 150. The substrate 110 is a transparent substrate and can be formed of glass or plastic. The black matrix 150 includes a light shade layer 120 formed in a predetermined shape on the substrate 110 and an ink-phobic layer 130 formed on the light shade layer 120. Inks having predetermined colors are filled in each of the pixel regions 140 using, for example, an inkjet method, to form pixels.

The light shade layer 120 is formed of an ink-philic black material. More specifically, the light shade layer 120 is formed of a polymer group organic resin, such as a polyimide.

The ink-phobic layer 130 can be a Carbon NanoTube (CNT) layer. In such a case, the ink-phobic layer 130, that is, the CNT layer, can have a thickness in a range of from 0.05 µm to 10 µm. A surface of the CNT layer has a hydrophobic property.

Figure 3:
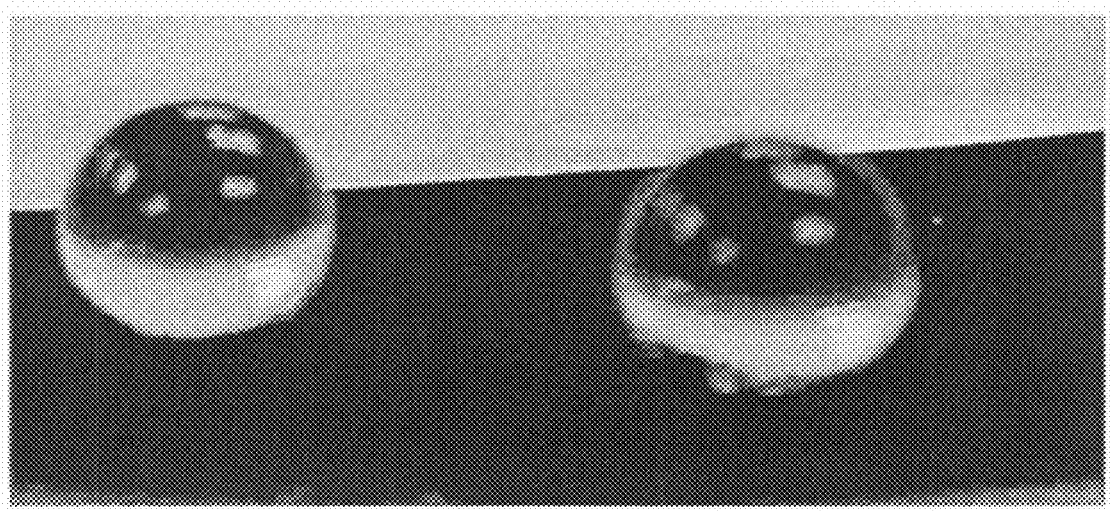
FIG. 3 is a photographic image of water drops contacting CNTs.

FIG. 3 is a photographic image of water drops contacting CNTs. Referring to FIG. 3, it can be seen that the CNTs have a high contact angle with respect to the water, that is, the CNTs are highly hydrophobic. Inks mainly used for manufacturing color filters are formed of mainly hydrophilic organic material. Therefore, the CNT layer that constitutes the upper surface of the black matrix 150 has an ink-phobic property.

The ink-phobic layer 130 can also be a fullerene layer. In such a case, the ink-phobic layer 130, that is, the fullerene layer, can have a thickness in a range of from 0.01 µm to 1 µm. The fullerene layer also has an ink-phobic property like that of a CNT layer.

As described above, in the black matrix 150 for a color filter according to the present embodiment, the side surfaces of the black matrix 150 have an ink-philic property since the light shade layer 120 is formed of an ink-philic material. The upper surface of the black matrix 150 has an ink-phobic property since the ink-phobic layer 130, formed of CNTs or fullerene, is formed on the upper surface of the light shade layer 120.

Figure 4:
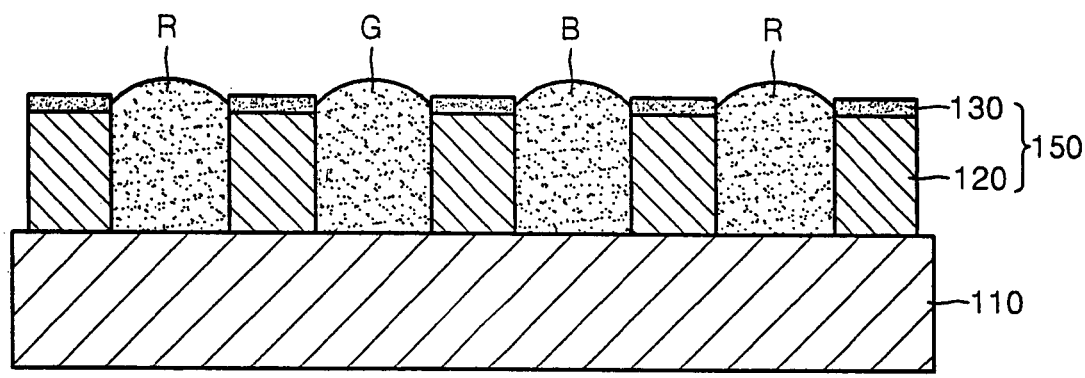
FIG. 4 is a cross-sectional view of a color filter manufactured using a black matrix according to an embodiment of the present invention.

FIG. 4 is a cross-sectional view of a color filter manufactured using a black matrix 150 according to an embodiment of the present invention. Referring to FIG. 4, the color filter includes a substrate 110, the black matrix 150 that defines pixel regions on the substrate 110, and ink layers R, G, and B having predetermined colors, for example, red R, green G, and blue B colors, which are filled in each of the pixel regions. As described above, the black matrix 150 includes a light shade layer 120, formed of an ink-philic black material in a predetermined shape, on the substrate 110 and a ink-phobic layer 130, formed of CNTs or fullerene, on an upper surface of the light shade layer 120. The ink layers R, G, and B can be formed by injecting predetermined inks using, for example, an inkjet method, into the pixel regions.

In the color filter of FIG. 4 according to the present embodiment, an upper surface of the black matrix 150 has an ink-phobic property. Therefore, ink mixing between the pixels is prevented when the pixels are formed by injecting inks into the pixel regions. Also, the ink layers R, G, and B are formed to a uniform thickness in the pixel regions since side surfaces of the black matrix 150 have an ink-philic property. Thus, color reproducibility and contrast ratio of the color filter according to the present embodiment is increased.

Figure 5:
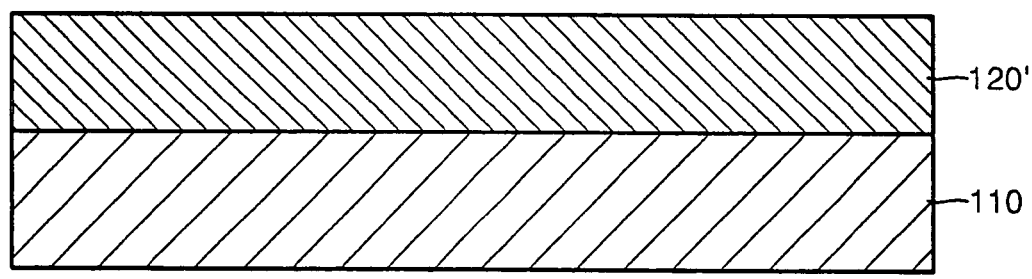
FIGS. 5 through 7 are cross-sectional views of a method of manufacturing a black matrix for a color filter according to an embodiment of the present invention.
Figure 6:
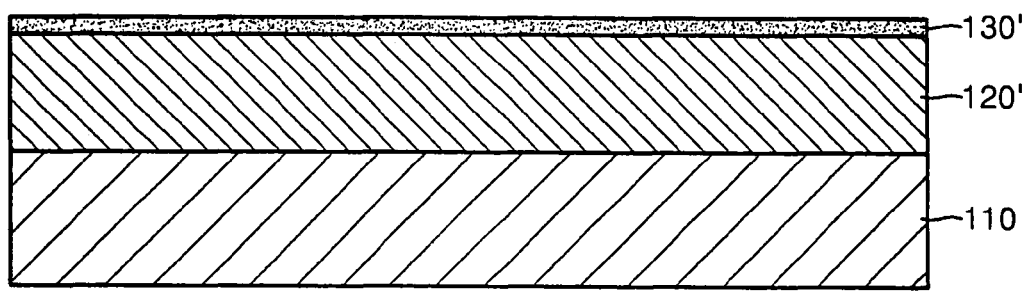
Figure 7:
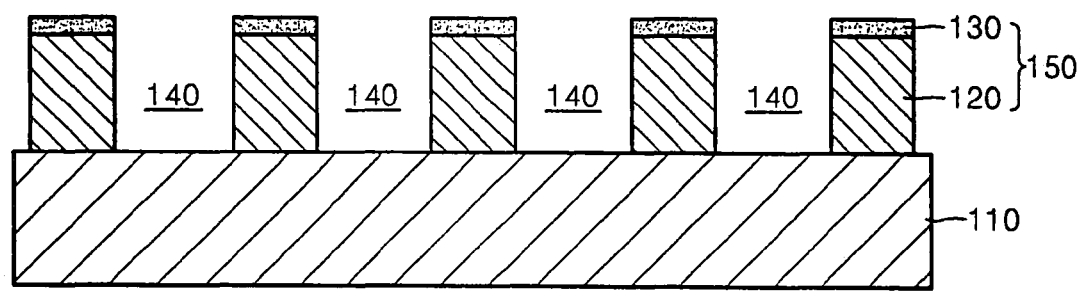

A method of manufacturing a black matrix for a color filter is described below. FIGS. 5 through 7 are cross-sectional views of a method of manufacturing a black matrix for a color filter according to an embodiment of the present invention.

Referring to FIG. 5, a substrate 110 is prepared. The substrate 110 is transparent and can be formed of glass or plastic. A light shade layer 120' is formed on the substrate 110. The light shade layer 120' can be formed by coating an ink-philic material to a predetermined thickness on the substrate 110 using a method, such as spin coating, die coating, or dip coating. The light shade layer 120' can be formed of a polymer group organic resin, such as a polyimide or photosensitive polyimide.

Referring to FIG. 6, an ink-phobic material layer 130' is formed on an upper surface of the light shade layer 120'. The ink-phobic material layer 130' can be a CNT layer. In such a case, the ink-phobic material layer 130', that is, the CNT layer, is formed to a thickness in a range of from 0.05 μm to 10 μm. The CNT layer can be formed by coating a dispersed solution, which is formed by dispersing CNTs in a solvent, on the upper surface of the light shade layer 120'. The coating of the dispersed solution can be performed by spin coating, spray coating, or dip coating. The CNT layer can also be formed by directly growing CNTs on the upper surface of the light shade layer 120' using a Chemical Vapor Deposition (CVD) method.

The ink-phobic material layer 130' can also be a fullerene layer. In such a case, the ink-phobic material layer 130', that is, the fullerene layer, can be formed to a thickness in a range of from 0.01 μm to 1 μm. The fullerene layer can be formed by coating a dispersed solution, which is formed by dispersing fullerene in a solvent, on the upper surface of the light shade layer 120'. The coating of the dispersed solution can be performed by spin coating, spray coating, or dip coating. The fullerene layer can also be formed by depositing fullerene on the upper surface of the light shade layer 120' using a vacuum evaporation method.

Referring to FIG. 7, a black matrix 150 is formed by patterning the light shade material layer 120' and the ink-phobic material layer 130'. The black matrix 150 consists of a light shade layer 120 and an ink-phobic layer 130 formed on an upper surface of the light shade layer 120. The black matrix 150 defines a plurality of pixel regions 140 on the substrate 110. More specifically, the patterning of the light shade layer 120' and the ink-phobic material layer 130' can be performed using the following method.

When the light shade layer 120' is formed of a non-photosensitive material, for example, a polyimide, after coating a photoresist (not shown) on an upper surface of the ink-phobic material layer 130', the photoresist is exposed and developed to a predetermined shape using a photolithography process. Next, the ink-phobic material layer 130' and the light shade layer 120' under the ink-phobic material layer 130' are sequentially etched until the substrate 110 is exposed using the developed photoresist as an etch mask. Afterwards, when the photoresist is removed, the black matrix 150 is formed. The etching of the light shade layer 120' and the ink-phobic material layer 130' can be performed using a plasma etching method, for example, a Reactive Ion Etching (RIE) method. When the light shade layer 120' is formed of a photosensitive material, for example, a photosensitive polyimide, the patterning of the light shade layer 120' and the ink-phobic material layer 130' can be achieved by exposing and developing the light shade layer 120' to a predetermined shape using a photolithography process. When the light shade layer 120' is developed, the ink-phobic material layer 130' located on upper parts of the light shade layer 120' that are removed by the development can also be removed by lifting off.

Up to now, a black matrix for a color filter mainly used in a liquid crystal display field and a method of manufacturing the black matrix have been described. However, the black matrix and the method of manufacturing the black matrix can also be applied to banks used in OELDs and a method of manufacturing the OLEDs.

As described above, according to the present invention, ink mixing between pixels of a color filter is prevented by forming an ink-phobic CNT layer or an ink-phobic fullerene layer on an upper surface of a black matrix. Also, ink layers having uniform thickness are formed in pixel regions since side surfaces of the black matrix according to the present invention have an ink-philic property. Accordingly, color reproducibility and contrast ratio of the color filter according to the present invention is increased.

While the present invention has been particularly shown and described with reference to exemplary embodiments thereof, it will be understood by those of ordinary skill in the art that various modifications in form and detail may be made therein without departing from the spirit and scope of the present invention as defined by the following claims.

What is claimed is:

1. A black matrix of a color filter, the black matrix comprising:
a light shade layer of an ink-philic black material arranged on a substrate of the color filter; and
a carbon nanotube layer arranged on an upper surface of the light shade layer.

2. The black matrix of claim 1, wherein the carbon nanotube layer comprises an ink-phobic material.

3. The black matrix of claim 1, wherein the light shade layer comprises a polymer group organic resin.

4. The black matrix of claim 3, wherein the light shade layer comprises a polyimide.

5. The black matrix of claim 1, wherein the carbon nanotube layer has a thickness in a range of from 0.05 μm to 10 μm.

6. A color filter comprising:
a substrate;
a black matrix arranged in a predetermined shape on the substrate to define a plurality of pixel regions, the black matrix including a light shade layer of an ink-philic black material arranged on the substrate and a carbon nanotube layer arranged on an upper surface of the light shade layer; and
ink layers having predetermined colors contained within each of the pixel regions.

7. A black matrix of a color filter, the black matrix comprising:
a light shade layer of an ink-philic black material arranged on a substrate of the color filter; and
a fullerene layer arranged on an upper surface of the light shade layer.

8. The black matrix of claim 7, wherein the fullerene layer comprises an ink-phobic material.

9. The black matrix of claim 8, wherein the light shade layer comprises a polymer group organic resin.

10. The black matrix of claim 9, wherein the light shade layer comprises a polyimide.

11. The black matrix of claim 7, wherein the fullerene layer has a thickness in a range of from 0.01 μm to μm.

12. A color filter comprising:
a substrate;
a black matrix arranged in a predetermined shape on the substrate to define a plurality of pixel regions, the black matrix including a light shade layer of an ink-philic black material arranged on the substrate and a fullerene layer arranged on an upper surface of the light shade layer; and ink layers having predetermined colors contained within each of the pixel regions.

13. A method of manufacturing a black matrix for a color filter, the method comprising:

forming a light shade layer of an ink-philic black material on a substrate;

forming a carbon nanotube layer on an upper surface of the light shade layer; and patterning the carbon nanotube layer and the light shade layer.

14. The method of claim 13, wherein the carbon nanotube layer is formed by coating a dispersed solution, in which carbon nanotubes are dispersed in a solvent, on an upper surface of the light shade layer.

15. The method of claim 14, wherein coating the dispersed solution is performed by one of spin coating, spray coating, or dip coating.

16. The method of claim 13, wherein the carbon nanotube layer is formed by directly growing carbon nanotubes on the upper surface of the light shade layer using a chemical vapor deposition method.

17. The method of claim 13, wherein the carbon nanotube layer is formed to a thickness in a range of from 0.05 µm to 10 µm.

18. The method of claim 13, wherein the light shade layer is formed of a polymer group organic resin.

19. The method of claim 18, wherein the light shade layer is formed of a polyimide.

20. The method of claim 13, wherein the patterning of the carbon nanotube layer and the light shade layer comprises:

coating a photoresist on an upper surface of the carbon nanotube layer;

exposing and developing the photoresist to a predetermined shape using a photolithography process;

etching the carbon nanotube layer exposed through the developed photoresist and the light shade layer under the carbon nanotube layer; and removing the photoresist.

21. The method of claim 20, wherein etching of the carbon nanotube layer and the light shade layer is performed using a plasma etching method.

22. The method of claim 13, wherein the light shade layer is formed of a photosensitive material.

23. The method of claim 22, wherein patterning of the carbon nanotube layer and the light shade layer is achieved by exposing and developing the light shade layer to a predetermined shape using a photolithography process.

24. A method of manufacturing a black matrix for a color filter, the method comprising:

forming a light shade layer of an ink-philic black material on a substrate;

forming a fullerene layer on an upper surface of the light shade layer; and patterning the fullerene layer and the light shade layer.

25. The method of claim 24, wherein the fullerene layer is formed by coating a dispersed solution, in which fullerene is dispersed in a solvent, on an upper surface of the light shade layer.

26. The method of claim 25, wherein coating the dispersed solution is performed by one of spin coating, spray coating, or dip coating.

27. The method of claim 24, wherein the fullerene layer is formed using a vacuum evaporation method.

28. The method of claim 24, wherein the fullerene layer is formed to a thickness in a range of from 0.01 µm to 1 µm.

29. The method of claim 24, wherein the light shade layer is formed of a polymer group organic resin.

30. The method of claim 29, wherein the light shade layer is formed of a polyimide.

31. The method of claim 24, wherein patterning of the fullerene layer and the light shade layer comprises:

coating a photoresist on an upper surface of the fullerene layer;

exposing and developing the photoresist to a predetermined shape using a photolithography process;

etching the fullerene layer exposed through the developed photoresist and the light shade layer under the fullerene layer; and removing the photoresist.

32. The method of claim 31, wherein etching of the fullerene layer and the light shade layer is performed using a plasma etching method.

33. The method of claim 24, wherein the light shade layer is formed of a photosensitive material.

34. The method of claim 33, wherein patterning of the fullerene layer and the light shade layer is achieved by exposing and developing the light shade layer to a predetermined shape using a photolithography process.

* * * * *